C. P. BEACH.
RIM TOOL.
APPLICATION FILED JUNE 5, 1918.

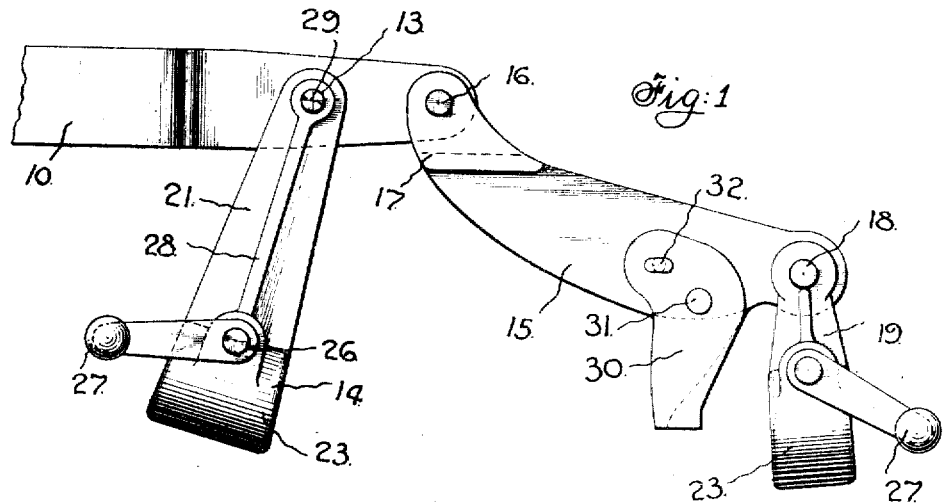
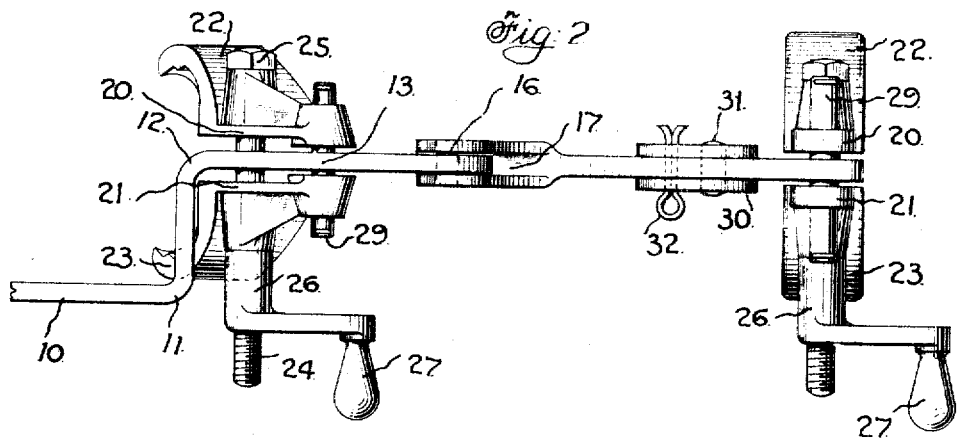

1,331,859.
Patented Feb. 24, 1920.
2 SHEETS—SHEET 2.

Inventor
Charles P. Beach
By his Attorneys

UNITED STATES PATENT OFFICE.

CHARLES P. BEACH, OF LITTLETON, NEW HAMPSHIRE.

RIM-TOOL.

1,331,859.

Specification of Letters Patent.   Patented Feb. 24, 1920.

Application filed June 5, 1918.   Serial No. 238,286.

*To all whom it may concern:*

Be it known that I, CHARLES P. BEACH, a citizen of the United States of America, residing in the town of Littleton, in the county of Grafton and State of New Hampshire, have invented an Improvement in Rim-Tools, of which the following is a specification.

This invention relates to improvements in tools for manipulating the tire carrying rims of vehicle wheels of the so-called demountable rim type. The principal object of the invention is to provide a rim tool which may be used interchangeably upon any of the well known types of demountable rims to contract the rim for the removal of the tire and to restore the rim to its operative condition after the tire has been replaced thereon. A further object of the invention is to provide a tool of the character which will be strong and durable in construction and simple in operation. Other objects of the invention will be apparent from the following description.

A preferred embodiment of the invention has been selected herein, for purposes of illustration and description; the same being shown in the accompanying drawings, wherein:

Figure 1 is a side elevation of the selected embodiment of the invention;

Fig. 2 is a top plan view; and

Figure 3:
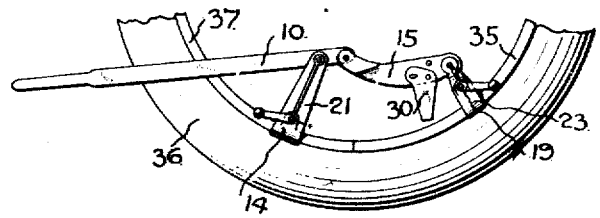

Figs. 3 to 7 inclusive show the device of Fig. 1 applied to a rim, a portion only of the rim and tire being shown, these figures illustrating the operation of the device.

Referring to the drawings, the rim tool shown therein comprises a handle or operating lever 10 offset from the center line of the device as shown clearly in Fig. 2. This offset enables the handle to be made as long as necessary to obtain the required leverage, its length not being limited by the interior diameter of the rim. Not only may a long lever be used but its movement is also unlimited by the rim. The handle has two right angle bends, as at 11 and 12, and is pivoted at 13 to a rim clamping member generally indicated by numeral 14. Just beyond the point 13 the handle is pivoted to a link 15, the connection being formed by a pin 16 passing through the bifurcated end 17 of the link 15 and through a hole in the handle. This link is pivotally connected at 18 to a second rim clamping member generally denoted by 19.

The clamping member 14 comprises two arms 20 and 21 formed with jaws 22 and 23 which are so shaped as to grip effectively any rim in general use. Above the jaws the arms are bored to receive a clamping bolt 24 which has an integral head 25 fitting into a depression in the arm 20 and threaded to receive a nut 26 having a handle 27 for turning it upon the bolt. When clamped in place the jaws are held at a distance from each other sufficient to permit the bifurcated end of the link 15 to pass between them in the operation of the device. The arms may be suitably strengthened by ribs 28 and bored at the upper end to receive a pivot pin 29 which passes through a hole in the operating lever 10. The arms are of such a length that the pivot 13 is a substantial distance from the clamping jaws, this distance being determined by the length of the operating handle from 13 to 16 and the length of the link 15.

The clamping member 19 is similar to the member 14 just described, the parts being correspondingly numbered, with the exception that the distance between clamping jaws and the pivot 18 is considerably less.

The link 15 is provided with a foot 30 which is pivoted thereto by a pin 31 and held in the position shown in Fig. 1 by a split pin 32 passing through holes in the foot and link. If and when desired the foot may be folded back upon the link for a purpose which will later appear.

The operation of the device may be described as follows with particular reference to Figs. 3 to 7 inclusive.

There are several well known types of demountable rims on the market and in general use. These rims are usually of one piece with a joint which may be "broken" and one end of the rim lapped over on the other to reduce its diameter and permit the tire to be easily removed therefrom. For illustration Figs. 3 to 7 show the portions of a rim 35 adjacent the joint and the outline of a portion of a pneumatic tire 36 in position on the rim. The principal difference in the several types of demountable rims usually lies in the character of the joint and the method of locking it. It is unnecessary to describe in detail any of these joints but sufficient to point out that in certain rims the abutting ends must be pulled apart before the rim can be contracted while in other forms one of the abutting ends must be lifted almost vertically for some distance and thrown over upon the other end. The tool shown herein is designed so that it may be easily adjusted and used with any of the well known types of demountable rims now on the market regardless of the nature of the joint.

Figure 4:
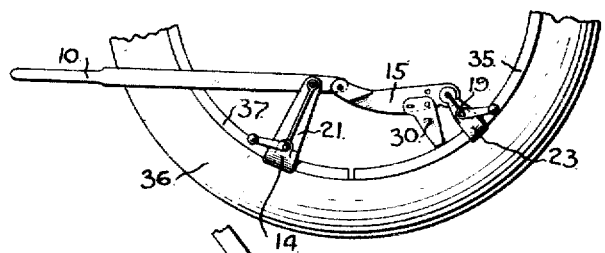
Figure 5:
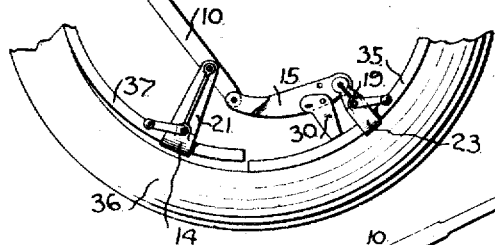
Figure 6:
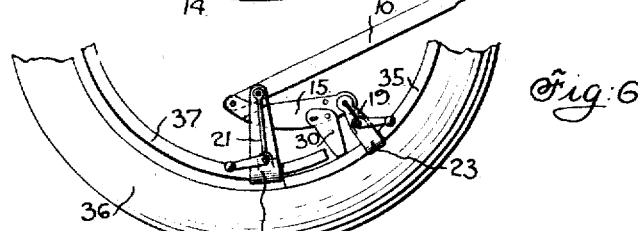

Referring to Fig. 3 the tool is shown attached to the rim which, it may be assumed, must be spread before the abutting ends can be lapped over each other to contract the rim. In this figure the clamping jaw 14 is attached to one end of the rim 37 as near the joint as possible, the jaws being securely fastened to the rim by rotation of the handle 27. The clamp 19 is so positioned on the other end of the rim that the depending foot will be raised slightly from the inner surface of the rim and under such circumstances the operating lever will assume substantially the position shown in Fig. 3. The clamp 19 is fastened to the rim securely by turning its handle 27 on the clamping bolt. If now the operating lever is rotated clockwise about its pivot 13 the toggle formed by the operating lever and link 15 will be straightened out until the foot 30 contacts with the inner face of the rim as shown in Fig. 4 where the abutting ends of the rim have been separated slightly. The link 15 now having two points in contact with its end of the rim will maintain the pivot 16 in fixed relation therewith and further rotation of the operating lever will raise the end 37 of the rim above the abutting end until the parts assume substantially the position in Fig. 5. Thereafter the continued movement of the operating handle will draw the pivot 16 between the arms of the gripping clamp 14 and bring the rim into substantially the position shown in Fig. 6 where the rim is so contracted that the tire may be easily removed therefrom. The resiliency of the rim will hold the parts in the position shown in Fig. 6.

Without removing the tool from the rim the tire may be repaired or another substituted therefor, placed in position and the handle 10 rotated in a contraclockwise direction to restore the rim to its normal position.

Figure 7:
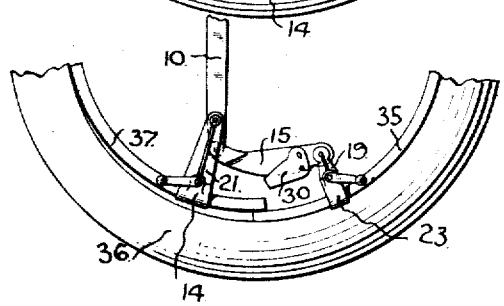

It may sometimes happen, particularly with rims that have been sprung or otherwise thrown out of shape, that the abutting ends will not readily resume their normal position but may possibly overlap each other slightly as shown for instance in Fig. 7. Under such circumstances it is necessary to expand the rim and force the abutting ends into position. This may be accomplished by the tool herein shown. For example, it may be assumed that the rim has taken the position shown in Fig. 7. If now the smaller clamp is loosened, the cotter pin through the foot removed and the foot folded up on the link, the operating lever may be placed in a substantially vertical position and the small clamp again tightened on the rim. If now the operating lever is moved to the left it will be readily seen that the rim will be forcibly expanded and the end 37 pressed down into position abutting the opposite end.

It is to be understood that the invention may be variously modified and embodied within the scope of the subjoined claims.

I claim as my invention:

1. A device of the character described comprising a pair of clamping jaws, means to clamp said jaws to a rim upon the opposite sides of the joint thereof, an operating lever pivoted to one of said jaws, a link connecting said lever with the other said jaws, and means to limit the movement of said link toward said rim whereby its outer end serves as a fulcrum for said operating lever.

2. A device of the character described comprising a pair of clamping jaws, means to clamp said jaws to a rim upon the opposite sides of the joint thereof, an operating lever pivoted to one of said jaws, a link connecting said lever with the other said jaws, and a depending lug upon said link to contact with said rim and limit the movement of the link relatively thereto.

3. A device of the character described comprising a pair of clamping jaws, means to clamp said jaws to a rim upon the opposite sides of the joint thereof, an operating lever pivoted to one of said jaws, a link connecting said lever with the other said jaws, a depending rim engaging lug pivoted to said link and free to swing out of rim engaging position, and means to hold said lug in operative position.

4. A device of the character described comprising a pair of clamping jaws, means to clamp said jaws to a rim upon the opposite side of the joint thereof, an operating lever pivoted to one of said jaws, a link connecting said lever with the other said jaws to form a toggle connection between said clamping members whereby the rim will be expanded upon initial movement of said lever, and means upon said link brought into contact with said rim after initial movement of said lever, whereby said link is held from movement with respect to the rim and the abutting end may be raised and the rim contracted.

5. A device of the character described comprising a clamping jaw adapted to engage a rim upon one side of the joint thereof, said jaw having an upstanding bifurcated arm, a lever pivoted to said arm, a second clamping jaw adapted to engage the rim on the opposite side of the joint, and a link connecting said lever and said second jaw and adapted to pass between the bifurcated ends of said arm upon rotation of the lever to separate and overlap the abutting ends of the rim.

In testimony whereof, I have signed my name to this specification this 3d day of June, 1918.

CHARLES P. BEACH.